Figure 1:
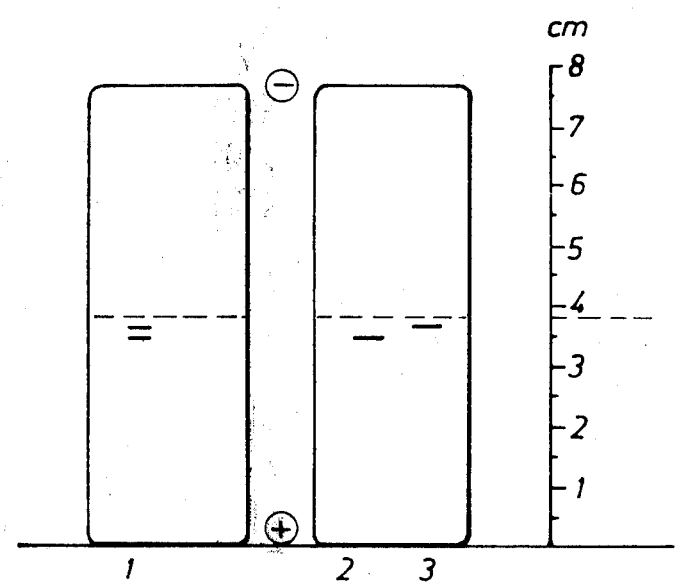

United States Patent [19]

Kutzbach et al.

[11] 3,905,870

[45] Sept. 16, 1975

[54] PURIFICATION OF KALLIKREIN

[75] Inventors: Carl Kutzbach; Gunther Schmidt-Kastner, both of Wuppertal, Germany

[73] Assignee: Bayer Aktiengesellschaft, Leverkusen, Germany

[22] Filed: Dec. 26, 1973

[21] Appl. No.: 431,546

Related U.S. Application Data

[63] Continuation-in-part of Ser. No. 303,615, Nov. 3, 1972, abandoned.

[52] U.S. Cl. .............. 195/62; 195/66 R; 195/66 B; 424/94
[51] Int. Cl.$^2$ .................. A61K 19/00; C07G 7/026
[58] Field of Search .................. 195/62, 66 R, 66 B

[56] References Cited
OTHER PUBLICATIONS

Methods in Enzymology, Vol. 19, pp. 681–699, (1970).
Methods in Enzymology Vol. 22, pp. 248–252, (1971).

*Primary Examiner*—Lionel M. Shapiro
*Attorney, Agent, or Firm*—Depaoli & O'Brien

[57] ABSTRACT

There is disclosed a process for the purification of Kallikrein, comprising components, Kallikrein A and Kallikrein B, otherwise known as the enzyme, Kininogenase, which includes the process steps of:

1. treating a crude aqueous solution containing Kallikrein with a solution of a lead or zinc salt to produce a precipitate containing Kallikrein;
2. eluting Kallikrein from said precipitate to produce a solution of Kallikrein;
3. desalinating said solution of Kallikrein to produce a desalinated solution of Kallikrein;
4. adsorbing the Kallikrein from the desalinated solution onto a macroporous anion exchange resin and eluting it therefrom to obtain an eluted solution containing Kallikrein; and thereupon
5. contacting the eluted solution with a macroporous cation exchanger; and separating said cation exchanger to produce a pure solution of Kallikrein.

The disclosed process also includes means for the production of purified components, Kallikrein A and Kallikrein B, as well as the crystallization of Kallikrein and its components and to pharmaceuticals and medicaments containing the same.

22 Claims, 4 Drawing Figures

PURIFICATION OF KALLIKREIN

CROSS-REFERENCE TO RELATED APPLICATIONS

This application is a continuation-in-part application of U.S. application Ser. No. 303,615, filed Nov. 3, 1972, now abandoned.

BACKGROUND OF THE INVENTION

When acting on endogenous kininogen, Kallikrein releases the kinins, which thereupon act on the circulation. Kallikrein preparations, therefore, are used therapeutically for the therapy of various perfusional disturbances (E. K. Frey, H. Kraut, E. Werle, "Das Kallikrein-Kinin System and its Inhibitors"), F. Enke, Stuttgart 1968, page 150 et. seq.)

Kallikrein is the trivial name of the enzyme kininogenase (Enzyme Commission Number 3.4.4.21).

Heretofore, according to customary practices, various processes have been utilized in obtaining partially purified preparations of Kallikrein from pancreas, submaxillaris or urine. For example, according to German Patentschrift No. 890,857, it is possible to thermolyse glands containing Kallikrein in aqueous suspension at temperatures of between 38° and 65°C and to separate the aqueous phases containing Kallikrein from insoluble constituents. Additionally, partially purified Kallikrein has be obtained, according to German Patentschrift No. 910,580, by forming a precipitate from urine or autolysis products of pancreas or submaxillaris by the addition of an aqueous solution of certain metal salts, separating off the precipitate, dissolving it in a phosphate buffer solution, particularly in diammonium hydrogen phosphate solution, dialysing the solution, concentrating the dialysis products and precipitating the active Kallikrein from the concentrate by means of an organic solvent, such as, for example ethanol or acetone.

Such Kallikrein preparations are still impure, but can be subjected to further purification in accordance with the teachings of German Patentschrift No. 1,102,973, by adsorbing Kallikrein onto basically substituted cellulose at pH values of 3 to 10, especially at pH 6.0 to 7.5, separating off the basically substituted cellulose, and eluting inactive concomitant substances with a very dilute buffer solution. The active substance can be desorbed from the basically substituted cellulose with a 1 to 5% strength solution of an electrolyte. Preparations containing about 50 to 100 KU/mg of protein (KU = Kallikrein unit) are thus obtained. Kallikrein preparations which are still very impure can also be further purified, according to German Patentschrift No. 1,124,187 by subjecting the same to an electrodialysis employing exchanger membranes. Preparations with 50 KU/mg are thus obtained.

Kallikrein preparations purified in this manner are only of qualified suitability for parenteral use mainly because the content of foreign proteins can lead to immunological sensitization and, on repeated use, to anaphylactic shock which is dangerous to life. Furthermore, it was difficult, with such previously known purification processes, to obtain preparations which are sufficiently free of pyrogenic substances. Also, it was not possible to remove pyrogens by filtration through clarifying and sterilizing filter layers, since Kallikrein itself is adsorbed to a high degree by these materials.

While it has been disclosed that smaller amounts of highly purified Kallikrein can be obtained according to some known processes, such processes present serious difficulties on a technical scale. Thus, according to H. Fritz et al (Hoppe Seyler's Z. Physiol. Chem 348, 1120–1132 (1967)), a preparation of specific activity 1,516 KU/mg of protein is obtained if a product which has been prepurified according to German Patentschrift No. 910,580 is chromatographed one to three times on hydroxylapatite-cellulose. However, it is necessary to determine the optimum concentration of the elution buffer each time for each Kallikrein sample and each new charge of the hydroxylapatitecellulose in preliminary experiments. Such a method does not readily lend itself to employment on an industrial scale.

In yet another proposed process, (H. Moriya et al, Biochem. Pharmacol. 18, 549–552 (1968)) electrophoretically pure Kallikrein is obtained in 6 to 9% yield starting from autolysed pancreas sludge by successive use of DEAE-cellulose, precipitation with 2-ethoxy-6,9-diamino-acridinium lactate, extraction of the precipitate with ammonium sulfate solution, precipitation with acetone, chromatography on hydroxylapatite and chromatography on Sephadex G 100. This process, again, illustrates the technical unfeasibility of the process because of the low yield and unusual number of process steps.

Kallikrein obtained according to the afore said process, on a laboratory scale, is a mixture of two isoenzymes. Kallikrein can be separated into two components, Kallikrein Component A and Kallikrein Component B, by electrophoresis or by chromatography on anion exchangers (E. Habermann, Hoppe-Seyler's Z. Physiol. Chemie 328, 15–23; F. Fiedler and E. Werle, ibid. 348, 1097–1089 (1967)). However, it is not yet known whether the slight structural difference resides in the aminoacid sequence or in the carbohydrate constituent since Kallikrein is a glycoprotein. The two components cannot be differentiated in biological activity.

Crystalline Kallikrein and crystalline Kallikrein Components A and B, also, have not been prepared heretofore.

Accordingly, a primary object of this invention resides in the provision of a process for the purification of the enzyme, Kallikrein.

Another object of the invention resides in the provision of a novel purification process for the production of the enzyme, Kallikrein, particularly adapted for use in the production of Kallikrein fractions containing enzyme components, Kallikrein component A and Kallikrein component B, respectively.

A further object of the invention resides in the provision of crystalline Kallikrein enzyme, as a novel composition of matter, and to novel means for its production.

Still a further object of the invention resides in the provision of crystalline Kallikrein A enzyme component as a novel composition of matter, and to novel means for its production.

A still further object of the invention resides in the provision of crystalline Kallikrein B enzyme component as a novel composition of matter, and to novel means for its production.

Other objects of the invention relate to novel pharmaceutical compositions and medicaments incorporating the aforesaid novel enzyme products and their use.

THE INVENTION

The present invention relates to processes for the purification of the enzyme, Kallikrein, which is considered to be a mixture of enzyme components generally referred to as Kallikrein component A and Kallikrein component B; to processes for their production as purified Kallikrein components A and B; to the crystalline forms of Kallikrein and its components; and to the pharmaceutical and medicament use.

More particularly, the present invention relates to a relatively simple process for obtaining pure, optionally crystalline Kallikrein, and the separation of Kallikrein to obtain the pure, optionally crystalline Kallikrein components A and B.

In accordance with the invention, relatively pure Kallikrein solutions can be obtained by a series of process steps which include:

1. treating a crude aqueous solution (generally an extract of tissues or urine) containing Kallikrein with a solution of a lead or zinc salt to produce a precipitate containing Kallikrein;

2. eluting Kallikrein from said precipitate to produce a solution of Kallikrein;

3. desalinating said solution of Kallikrein to obtain a desalinated solution of Kallikrein;

4. adsorbing the Kallikrein from the desalinated solution onto a macroporous anion resin (for example DEAE cellulose or DEAE Sephadex) and eluting it therefrom to obtain an eluted solution containing Kallikrein; and 5. contacting the eluted solution with a macroporous cation exchange resin (for example CM-Sephadex or SE-Sephadex); and separating the exchanger therefrom to produce a pure solution of Kallikrein.

Optionally, if desired, after step (3), (4) or (5), but preferably after step (5), the solution of relatively pure Kallikrein is, in accordance with the invention, fractionated to produce fractions containing Kallikrein component A and Kallikrein component B respectively. This fractionation may be carried out in any manner, but it is preferred to employ chromatographic techniques on anion exchangers, for example on DEAE-cellulose or DEAE-Sephadex. Fractions thus produced after step (3) are then further worked up separately according to steps (4) and (5), and fractions thus produced after step (4) are worked up separately according to step (5), to provide pure solutions of Kallikrein components A and B.

The pure solution of Kallikrein and Kallikrein components A and B, thus produced, exceed, in specific activity, all the hitherto known preparations presently known and, additionally, are substantially free of antigencially active foreign proteins and pyrogens.

The enzymatic activity of Kallikrein and its components A and B can be determined by measuring the hydrolysis of N-benzoyl-1-arginine ethyl ester (E. Werle and B. Kaufmann-Bretsch, "Naturwissenschaften" 46, 559 (1959)) in the embodiment standardized by the F.I.P. (Federation Internationale Pharmaceutique) as a titrimetric test (publication 1972 in J. mond. Pharm.). To convert the enzymatic units into the biological Kallikrein units (KU) determined by measuring the lowering of the blood pressure in dogs (E. Frey, Kraut. E. Werle, "Das Kallikrein-Kinin-System und seine Inhibitoren" ["The Kallikrein-Kinin-System and its Inhibitors"], F. Enke, Stuttgart 1968, page 11), a factor of 1 KU = 6.37 F.I.P. units is employed. The protein content of solutions of pure Kallikrein is determined from the extinction at 280 nm, based on an extinction coefficient of $E_{280}^{1\%} = 19.3$, that is, the extinction of a 1% strength solution of Kallikrein at pH 7.0.

The metal salts employed in step (1) of the aforesaid process can be any soluble lead or zinc salt with lead and zinc acetates being preferred.

The elution carried out in step (2) is preferably carried out with an eluant comprising a solution of a phosphate buffer solution, or of sodium carbonate or bicarbonate, or dilute ammonia. Other eluants normally employed in biochemical processes can also be employed.

The desalination of step (3) is generally carried out by dialysis or gel filtration, for example through a column of Sephadex G-25.

Further exemplary details of steps (1), (2) and (3), can be found in German Patentschrift No. 910,580 and also in the Example 1 which follows below.

The macroporous anion exchanger employed in step (4) of the process according to the invention may be, for example, a basically substituted cellulose or gel of sufficient pore size. Preferably, step (4) is carried out on columns of DEAE-Sephadex. The adsorption of Kallikrein generally takes place at a pH of 4.0 to 8.0, preferably at pH 4.5 to 5.0. The Kallikrein is desorbed by eluting with a solution of increasing salt concentration at constant pH, or with a solution of decreasing pH at constant salt concentration, or with a combination of such changes in salt concentration and pH. The change of pH and salt concentration can take place continuously, as gradient elution, or stepwise. Any of the known buffer salts can be used such as the volatile buffer salts, for example ammonium formate, ammonium acetate, ammonium propionate and the corresponding alkylammonium salts, for example, triethylammonium formate, which are preferably employed.

In a preferred embodiment of step (4) of the process according to the invention, Kallikrein is adsorbed from 0.2 M ammonium acetate at pH 5.0 on DEAE-Sephadex in the form of a column, inactive protein is eluted with 0.25 M ammonium acetate at pH 5.0, and thereafter the Kallikrein is eluted with 0.3 M ammonium acetate at pH 4.5.

Chromatography on macroporous anion exchangers represents a significant improvement of the process according to German Patentscrift No. 1,102,973, which it decisively surpasses in yield and simplicity of execution on an industrial scale.

The eluted solution of Kallikrein thus obtained is further purified, in step (5) of the process, according to the invention, by treatment with a macroporous cation exchanger. Preparations of about 90% purity can thereby be obtained. As the macroporous cation exchanger it is contemplated employing, in particular, an acid-substituted cellulose or an acid-substituted gel, for example, a crosslinked dextran or polyacrylamide gel, of sufficient pore size. A suitable, representative, commercially available exchanger is CM-Sephadex C-50. The treatment of the eluted solution of Kallikrein produced in step (4) with the cation exchanger can be carried out by stirring the solution with the exchanger or by filtering the solution through layers of the exchanger. When columns are used it is advisable to concentrate and desalinate the eluted solution of Kallikrein from the previous stage (4). During stirring or during the filtration process, the gels retain accompanying impurities while Kallikrein passes unhindered through the filter layer.

The macroporous cation exchanger, generally, should be pre-treated in the manner known to the art. When used by filtration, it should be stirred with a dilute buffer solution and is generally suspended in a column. The ratio of column length to column diameter is of secondary importance for the filtration process of step (5). A column of large diameter is preferably used. The buffer solution can contain the usual buffer salts, but volatile buffer salts, for example ammonium formate, ammonium acetate, ammonium propionate or the corresponding alkylammonium salts, for example triethylammoium formate, are generally preferred.

The pH value of the buffer solution used for pretreatment of the cation exchangers and treatment of the Kallikrein solution can be between 4.5 and 8.5, preferably between 5.0 and 7.0.

In accordance with the invention, crystalline Kallikrein can be obtained in an optional further step (6a) by precipitation from the pure solution resulting from step (5). Preferably such precipitation is carried out by the addition of solid or concentrated aqueous ammonium sulfate at pH 4.0 to 8.0. At a temperature of 15°–25°C. and an ammonium sulfate saturation of about 45%, crystals of pure Kallikrein begin to separate out within a few days. The crystals have the form of thin needles which bunch together in bundles. They can be separated from the mother-liquor by centrifuging or filtration, washed with 50% saturated ammonium sulfate solution, and redissolved if desired in dilute salt solution or water.

Crystalline Kallikrein components A and B are thus obtained according to the invention in a similar way from the separate pure solutions of component A and component B obtained as described above from step (5). The crystals appear within a few days under the same conditions and have exactly the same appearance as those of Kallikrein.

The Crystalline forms of Kallikrein, Kallikrein component A, and Kallikrein component B obtained in accordance with the invention as described above, possess a specific activity of about 1,600 KU/mg. of protein. The specific activity of said components could not be further increased even by repeated recrystallization.

The crystalline forms of the Kallikrein component A and Kallikrein component B obtained as described above are also electrophoretically homogeneous as illustrated as follows:

The data obtained as a result of the electrophoresis experiment is illustrated in FIG. 1. Electrophoresis was carried out with Veronal-sodium buffer at pH 8.6. The ionic strength was 0.075; voltage 100 V; period of migration: 20 minutes. At time zero, material was applied at the level of the broken line. Track 1 is Kallikrein, track 2 is Kallikrein component A, and track 3 is Kallikrein component B. The specific activity of approximately 1,600 KU/mg. of protein cannot be increased further even by repeated recrystallization.

It is indeed surprising that, employing the process according to the invention, separation of partially purified Kallikrein from its accompanying substances and foreign enzymes can be accomplished in such an extreme manner and without the use of complex elution methods. It was entirely unexpected that the accompanying substances and the foreign enzymes, but not Kallikrein, would be retained by the macroporous cation exchangers and that the Kallikrein remaining in solution would be obtained, according to the process of the invention, in substantial yields and in relatively high purity. By subsequent crystallization of the two Kallikrein components A and B, even the pyrogenic substances, which are ordinarily difficult to remove, are separated practically completely. The relative simplicity of the process according to the invention also lends itself to be carried out on an industrial scale. Accordingly, the teachings according to the invention represent a substantial contribution to the art.

Figure 2:
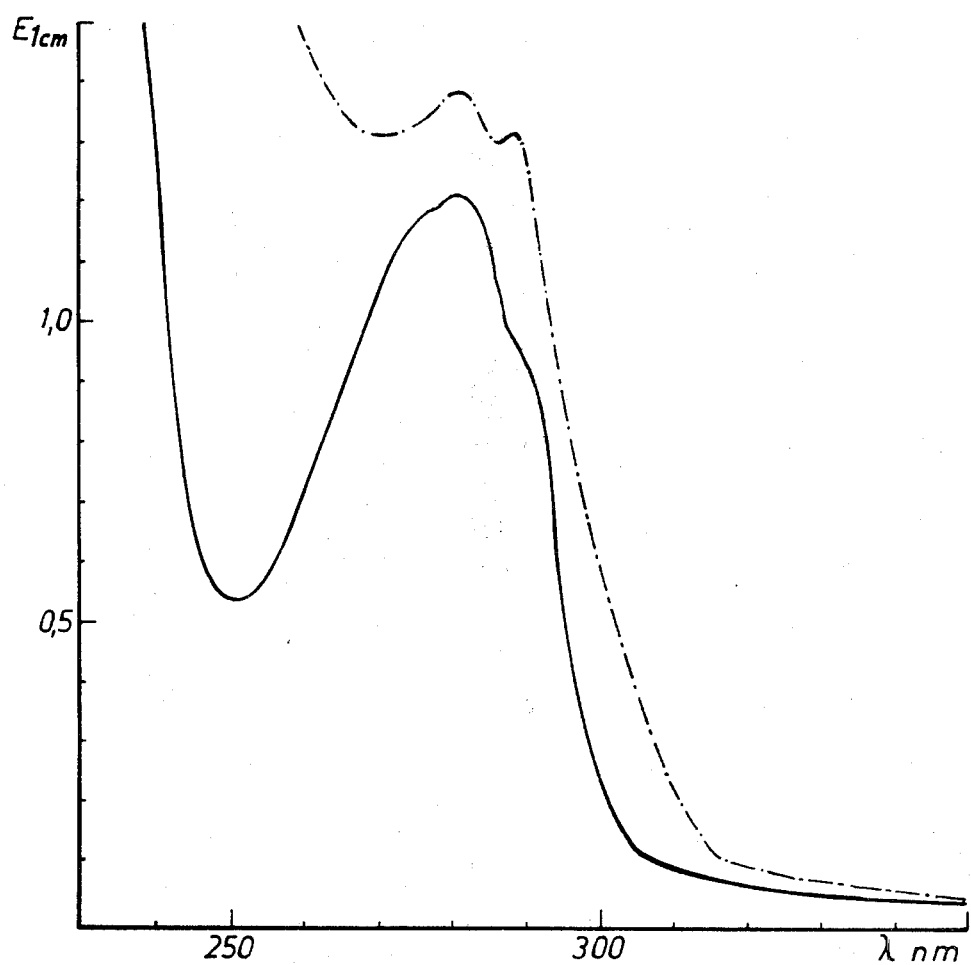
Figure 3:
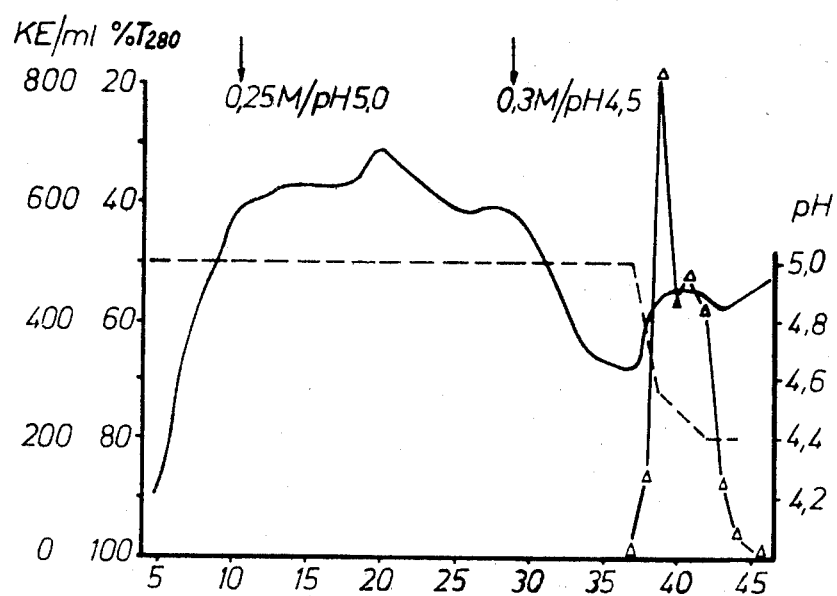

The solution of the crystals of Kallikrein or the Kallikrein components is characterized by a UV spectrum, at pH 7, which has a maximum at 282 nm, a minimum at 251 nm, two shoulders at 277 and 290 nm and a ratio of the extinctions at 280 and 260 nm of 1.78 as illustrated by the unbroken curve in FIG. 2.

In 0.1 N NaOH solution, the UV spectrum shows two maxima at 280 and 289 nm as shown by the broken curve in FIG. 2.

Kallikrein has a number of medicinal applications. It is particularly useful, owing to its vaso-dilating action, in the treatment of peripheral perfusional disturbances, for example Endangiitis obliterans, Arteriosclerosis obliterans, and Morbus Raynaud, in disturbed healing of fractures and wounds, for example the Sudeck Syndrome, burns and circulatory disturbances due to age. The pure solutions of Kallikrein and of its components A and B, and the crystalline Kallikrein and its components A and B that are produced in accordance with the invention can, owing to their purity, advantageously be used in all the known treatments involving the use of Kallikrein.

Therefore, as stated above, the invention also relates to the use in human medicine of the Kallikrein and its components A and B purified by the process of the invention, and of crystalline Kallikrein and Kallikrein components A and B, however prepared.

In the following disclosure of the pharmaceutical use of the Kallikrein and its components A and B, the expression "Kallikrein of the invention" includes:

a. Kallikrein and Kallikrein components A and B in the form of the pure solutions produced in accordance with the invention; and b. Kallikrein and Kallikrein components A and B obtained from the pure solutions produced in accordance with the invention, for example by lyophilization or by crystallization; and c. crystalline Kallikrein and crystalline Kallikrein components A and B, however produced.

The present invention also provides pharmaceutical composition containing, as an active ingredient, Kallikrein produced in accordance with the techniques of the invention in admixture with a solid diluent, or in admixture with a liquid diluent other than a solvent having a molecular weight of less than 200 and preferably less than 350 except in the presence of a surface active agent.

The invention further contemplates pharmaceutical compositions containing as active ingredient therein a Kallikrein produced in accordance with the techniques of the invention in the form of a sterile or isotonic aqueous solution.

The invention also contemplates medicaments in dosage unit form comprising Kallikrein produced in accordance with the invention either alone or in admixture with a diluent.

The invention further contemplates medicaments in the form of tablets such as lozenges and granules, dragees, capsules, pills, ampoules or suppositories containing Kallikrein produced in accordance with the invention, either alone or in admixture with the diluent.

"Medicament" as used herein is intended to include physically discrete coherent portions suitable for medical administration. "Medicament in dosage unit form" as used herein is intended to include physically discrete coherent portions, suitable for medical administration, each containing a daily dose or a multiple (up to four times) or sub-multiple (down to a fortieth) of a daily dose of Kallikrein when produced in accordance with the invention. Whether the medicament contains a daily dose or, for example, a half, a third, or a quarter of a daily dose will depend on whether the medicament is to be administered once or, for example, twice, three times or four times a day respectively.

The diluents to be used in pharmaceutical compositions (e.g., granulates) adapted to be formed into tablets, dragees, capsules and pills include the following:

a. fillers and extenders such as, for example, starch, sugars, mannitol, and silicic acid; (b) binding agents, such as, for example, carboxymethyl cellulose and other cellulose derivatives, aliginates, gelatine and polyvinyl pyrrolidone; (c) moisturizing agents, such as, for example, glycerol; (d) disintegrating agents, such as, for example, calcium carbonate and sodium bicarbonate; (e) agents for retarding dissolution, for example, paraffin; (f) resorption accelerators, such as, for example, quaternary ammonium compounds; (g) surface active agents, such as, for example, cetyl alcohol, glycerol monostearate; (h) adsorptive carriers, such as, for example, kaolin and bentonite; (i) lubricants, such as, for example, talc, calcium and magnesium stearate and solid polyethylene glycols.

The tablets, dragees, capsules and pills formed from the pharmaceutical compositions of the invention can have the customary coatings, envelopes and protective matrices, which may contain opacifiers. They can be so constituted in such a manner that they release the active ingredient only or preferably in a particular part of the intestinal tract, possibly over a period of time. The coatings, envelopes and protective matrices may be made, for example, of polymeric substances or waxes all well known in the art.

The ingredient can also be made up in microencapsulated form, together with one or several of the above-mentioned diluents.

The diluents which can be employed in the pharmaceutical compositions adapted to be formed into suppositories can, for example, be the usual water-soluble or water-insoluble diluents, such as polyethylene glycols and fats (e.g., cocoa oil and high esters [e.g., $C_{14}$-alcohol and $C_{16}$-fatty acid]) or mixtures of these diluents.

Pharmaceutical compositions which are ointments, pastes, creams and gels can, for example, contain the usual diluents, e.g., animal and vegetable fats, waxes, paraffins, starch, tragacanth, cellulose derivatives, polyethylene glycols, silicones, bentonites, silicic acid, talc and zinc oxide or mixtures of these substances.

Pharmaceutical compositions in the form of powders and sprays can, for example, contain the usual diluents, such as, for example lactose, talc, silicic acid, aluminum hydroxide, calcium silicate, and polyamide powder or mixtures of these substances.

Pharmaceutical compositions in the form of solutions and emulsions can, for example, contain the customary diluents (with, of course, the above-mentioned exclusion of solvents having a molecular weight below 200 except in the presence of a surface-active agent), such as solvents, dissolving agents, and emulsifiers; a specific example of such diluent being water.

For parenteral administration, the solutions and emulsions should be sterile, and, if appropriate, blood-isotonic.

Injectable compositions having a delayed action may be produced from Kallikrein produced in accordance with the invention by additions of high molecular colloids, such as those illustrated in German Patentschrift No. 941,685, which include, by way of example, polyvinylpyrrolidone or dextran, or by forming complexes with Kallikrein inhibitor (e.g., Trasylol R according to German Patentschrift No. 1,000,566. Kallikrein prepared in accordance with the invention can be prepared for injection either in the form of an isotonic solution ready for use or in the solid form by freeze-drying of a mixture of the crystalline Kallikrein with excipients such as dextran, mannitol, lactose or gelatine, from which the ready-for-use solution is prepared, immediately before use, by dissolving it in a suitable solvent.

Pharmaceutical compositions prepared for use as suspensions can contain the usual diluents, such as liquid diluents, such as, for example, water, surface-active agents (e.g., ethoxylated isostearyl alcohols, polyoxyethylene sorbite and sorbitane esters), microcrystalline cellulose, aluminium metahydroxide, bentonite, agaragar and tragacanth or mixture thereof.

All the pharmaceutical compositions in accordance with the invention can also contain coloring agents and preservatives as well as perfumes and flavoring adjuvants, such as peppermint oil and eucalyptus oil and sweetening agents such as saccharin.

The pharmaceutical compositions prepared according to the invention contain about 1.0% to about 99.5%, and preferably from about 0.001% to 95% of Kallikrein as the active ingredient, by weight of the total composition.

The pharmaceutical compositions and medicaments produced according to the invention can also contain other pharmaceutically active compounds in addition to one or more Kallikrein forms produced in accordance with the process of the invention.

Any diluent employed in the preparation of the medicaments of the present invention may be any of those mentioned above in relation to the pharmaceutical compositions of the present invention. Such medicaments can include solvents of molecular weight less than 200 as sole diluent.

The discrete coherent portions constituting the medicaments according to the invention (whether in dosage unit form or not) can be, for example, any of the following: tablets, (including lozenges and granules), pills, dragees, capsules, suppositories and ampoules. If desired, certain of these forms can be made prepared for delayed release of the active ingredient. Some forms, such as capsules, include a protective envelope which renders the portions of the medicament physically discrete and coherent.

The production of the above-mentioned pharmaceutical compositions and medicaments is generally carried out by the usual method known in the art, such as, for example, by mixing the active ingredient or ingredients with diluent or diluents to form a pharmaceutical composition, such as a granulate, and subsequently forming the composition into the medicament such as a tablet.

Consequently, preferred pharmaceutical compositions and medicaments are those adapted for peroral and parenteral administration, such as tablets, dragees and injectable solutions.

The following Examples will serve to illustrate the practice of the invention.

EXAMPLE 1

PRODUCTION OF A PURE SOLUTION OF KALLIKREIN 200 l of an eluate of a lead salt precipitate, obtained according to German Patentschrift No. 910,580 from pig pancreas, was dialysed, and found to contain 10.8 million KU. The eluate was concentrated to a volume 15 l in a thin layer evaporator and desalinated by gel filtration through a column of Sephadex G-25. The desalinated solution was adjusted to pH 5.0 with acetic acid and a slight precipitate formed thereby was filtered off. Solid ammonium acetate was then added until a specific conductivity of 12 mS was reached. The solution was then passed through a 20 × 65 cm column (20 l) of DEAE-Sephadex A-50, equilibrated with 0.2 M ammonium acetate at pH 5.0, upon which Kallikrein is adsorbed. The column was subsequently eluted first with about 40 l of 0.25 M ammonium acetate at pH 5.0 and then with 0.3 M ammonium acetate at pH 4.5. Kallikrein appeared in the eluate shortly after the pH value had dropped to about 4.5 as shown in FIG. 2. The active fractions contained 9.35 million KU (86.5%). The solution was concentrated in vacuo and desalinated through a column of Sephadex G-25; a lyophilized sample had a specific activity of 414 KU/mg of weighed-out material.

FIG. 3

Ordinate units:
0 to 800: Kallikrein units (KU) per ml solution
100 to 20: UV-transmission in percent (wavelength 280 nm)
4.2 to 5.0: pH value
Abscissa units: fraction number The uninterrupted curve between fractions 5 and 45 illustrates the change of the UV-adsorption during the elution process whereas the dotted curve illustrates the change in pH value. The line joining the triangles shows the change in activity during elution, given in KU/ml.

Figure 4:
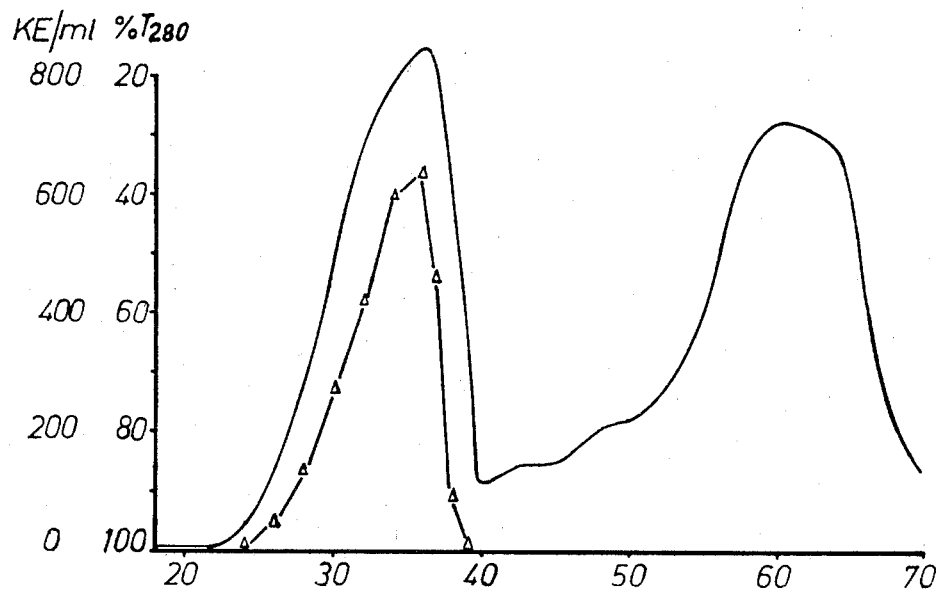

The desalinated solution of 300 ml volume was filtered through a 10 × 130 cm column (10 l) of CM-Sephadex C-50, and equilibrated with 0.01 M ammonium acetate at pH 5.0. Kallikrein appeared first in the eluate, followed by inactive impurities (FIG. 4). The Kallikrein fraction (930 ml) contained 5.5 million KU (59%). A lyophilized sample has a specific activity of 1,060 KU/mg of weighed-out material or 1,220 KU/mg of protein. The fever effect according to the test described in the Deutsches Arzneibuch was 1.85 ($\Sigma (\Delta T)^2$ of 3 animals).

FIG. 4

Ordinate units:
0 to 800: KU per ml solution
100 to 20: UV-transmission in percent (wavelength 280 nm)
Abscissa units: fraction number The line joining the triangles shows the change in activity of the eluate, given a KU/ml. The other curve shows the change in the UV-absorption.

EXAMPLE 2

PRODUCTION OF CRYSTALLINE KALLIKREIN

A part of the solution containing 115,000 KU was concentrated to 5 ml and saturated ammonium sulfate solution was added until 45% saturation was reached. The crystallization started after 6 days at 20° to 25°C. After 3 weeks, the crystals were centrifuged off, washed once with 5 ml of 50% strength saturated ammonium sulfate solution and dissolved in 0.05 M phosphate buffer at pH 7.0. The specific activity of the Kallikrein in this solution was 1,560 KU/mg of protein. The yield was 71% and the fever effect according to DAB was 0.32.

EXAMPLE 3

PRODUCTION OF PURE SOLUTION OF KALLIKREIN COMPONENTS A AND B 4.42 Million KU of a solution of highly purified Kallikrein, obtained as described in EXample 1, were adsorbed on a 5 × 100 cm column of DEAE-Sephadex A-50, equilibrated with 0.2 M ammonium acetate at pH 6.7. Elution was carried out with a convex gradient of 0.2 to 0.55 M ammonium acetate at pH 6.7, produced using a 2 l mixing vessel. Two slightly overlapping activity peaks of Kallikrein appeared in the eluate, of which the first was identified electrographically as Kallikrein component B and the second as Kallikrein component A. The fractions containing pure Kallikrein A or pure Kallikrein B were combined. The following were obtained:

2.1 million KU of Kallikrein component B (47.5%);
1.25 million KU of Kallikrein component A (28%); and
0.32 million KU of a mixture of Kallikrein components A and B from the overlapping region of the peaks (7.2%), making a total of 83%.

EXAMPLE 4

PRODUCTION OF CRYSTALLINE KALLIKREIN COMPONENT B

A part of the solution containing Kallikrein component B was concentrated to a concentration of about 20,000 KU/ml and saturated ammonium sulfate solution was added until 45% saturation was reached. Crystallization started after 6 days at 20° to 25°C. After 4 weeks, the crystals were centrifuged off, washed with 50% strength saturated ammonium sulfate solution and dissolved in 0.05 M phosphate buffer at pH 7.0. The specific activity was 1,650 KU/mg of protein and the yield was 64%.

EXAMPLE 5

PRODUCTION OF CRYSTALLINE KALLIKREIN COMPONENT A

In the same way as described in Example 4, crystalline Kallikrein component A was produced. Under the microscope no difference in appearance between the crystals of Kallikrein component A and those of Kallikrein component B could be seen.

What is claimed is:

1. A process for the purification of Kallikrein, comprising the steps of:
   1. treating a crude aqueous solution containing Kallikrein with a solution of a lead or zinc salt to produce a precipitate containing Kallikrein;
   2. eluting Kallikrein from said precipitate to produce a solution of Kallikrein;
   3. desalinating said solution of Kallikrein to produce a desalinated solution of Kallikrein;
   4. adsorbing the Kallikrein from the desalinated solution onto a macroporous anion exchange resin and eluting it therefrom to obtain an eluted solution containing Kallikrein; and thereupon
   5. contacting the eluted solution with a macroporous cation exchanger; and separating said cation therefrom to produce a pure solution of Kallikrein.

2. The process of claim 1 in which the salt employed in step 1 is a member of the group consisting of lead and zinc acetate.

3. The process of claim 1 in which the desalination of step (3) is carried out by dialysis or gel filtration.

4. The process of claim 1 in which the macroporous anion exchanger is a member of the group consisting of a basically substituted dextran gel and cellulose.

5. The process of claim 1 in which the Kallikrein is adsorbed in step (4) at pH 4.5–5.0.

6. The process of claim 1 in which the Kallikrein is eluted in step (4) by an eluant of constant pH and increasing salt concentration.

7. The process of claim 1 in which the Kallikrein is eluted in step (4) by an eluant of constant salt concentration but decreasing pH.

8. The process of claim 1 in which the cation exchanger is a member of the group consisting of an acidically substituted crosslinked dextran, a polyacrylamide gel and cellulose.

9. The process of claim 1 in which the Kallikrein is treated with the cation exchanger at pH 5.0–7.0.

10. The process of claim 1 in which the cation exchanger is equilibrated prior to use with a dilute solution of a volatile buffer salt at pH 5.0 to 7.0.

11. The process of claim 1 which includes, in step (5), the eluted solution is stirred with the cation exchanger.

12. The process of claim 1 in which, in step (5), the eluted solution is passed through a column of the cation exchanger.

13. The process of claim 1 which includes the additional subsequent step (6a) of precipitating crystalline Kallikrein from the pure solution produced in step (5).

14. The process of claim 13 in which the step (6a) the crystalline Kallikrein is precipitated by the addition of solid or concentrated aqueous ammonium sulfate at pH 4.0–8.0.

15. The process of claim 1 including the additional subsequent step (6b) of fractionating the pure solution produced in step (5) to produce fractions containing Kallikrein component A and Kallikrein component B respectively.

16. The process of claim 1 including the additional step (6c) of fractionating the solution of Kallikrein obtained in step (3) or (4) to produce separate fractions containing Kallikrein component A and Kallikrein component B respectively, and working up at least one of these fractions separately according to steps (4) and (5) or step (5) respectively.

17. The process of claim 15 in which the solution of Kallikrein is fractionated by chromatography on basically substituted cellulose or dextran gel.

18. The process of claim 15, comprising also the additional subsequent step (7) of precipitating crystalline Kallikrein component A and/or crystalline Kallikrein component B from the respective fraction.

19. The process of claim 18 in which the precipitation is carried out by the addition of solid or concentrated aqueous ammonium sulfate at pH 4.0–8.0.

20. Crystalline Kallikrein having a specific activity of about 1600 kU/mg of protein.

21. Crystalline Kallikrein component A having a specific activity of about 1600 KU/mg of protein.

22. Crystalline Kallikrein component B having a specific activity of about 1600 KU/mg of protein.

* * * * *